United States Patent [19]
Parenti

[11] Patent Number: 6,158,154
[45] Date of Patent: Dec. 12, 2000

[54] LICENSE PLATE LOCK

[76] Inventor: Steve Parenti, 36425 Newark Blvd., Newark, Calif. 94560

[21] Appl. No.: 09/052,909

[22] Filed: Mar. 31, 1998

[51] Int. Cl.[7] .................................................. G09F 7/00
[52] U.S. Cl. ................................ 40/200; 40/201; 40/210
[58] Field of Search ............................. 40/200, 201, 202, 40/203, 207, 210, 643, 661.08, 661.11; 70/54, 55, 56, 164, 230

[56] References Cited

U.S. PATENT DOCUMENTS

| | | | |
|---|---|---|---|
| 1,132,950 | 3/1915 | McCallion | 40/661.11 X |
| 1,208,236 | 12/1916 | Thompson et al. | 70/230 |
| 1,859,134 | 5/1932 | Foti | 40/643 |
| 2,576,374 | 11/1951 | Whitwell | 40/207 X |
| 2,628,008 | 2/1953 | Innis | 40/643 X |
| 3,120,067 | 2/1964 | Burke | 40/661.11 X |
| 3,498,400 | 3/1970 | Hysmith | 70/230 X |
| 3,783,657 | 1/1974 | Foote | 70/54 X |
| 3,826,115 | 7/1974 | Davis | 70/230 X |
| 4,506,528 | 3/1985 | Eberly | 70/54 X |
| 4,655,060 | 4/1987 | Jakubas | 70/230 |
| 4,788,840 | 12/1988 | Wilson, Jr. | 70/164 |
| 5,199,286 | 4/1993 | Jakubas | 70/230 |
| 5,299,721 | 4/1994 | Cummings | 70/164 X |
| 5,487,288 | 1/1996 | Frantz | 70/230 X |
| 5,659,986 | 8/1997 | Simmons | 40/202 |

*Primary Examiner*—Joanne Silbermann

[57] ABSTRACT

The present invention is a locking device having a renewal sticker theft prevention window locking device that is applicable for license plates which display such renewal stickers in any corner of the license plates. The license plate locking means has the lock shackle positioned such that it would not be readily attachable or exposed to cutting such as by a hacksaw or other cutting device-that is the lock shackle is protected therefrom by enveloping the shackle in a protected enclosure.

4 Claims, 9 Drawing Sheets

LICENSE PLATE LOCK

This application is related to patent application Ser. No. 09/002062, filed Dec. 31, 1997, now abandoned, entitled "Theft Proof License Plate Apparatus", the disclosure of which is hereby referred to and incorporated herein by reference.

FIELD OF THE INVENTION

This invention relates in general to a locking means for locking license plate attachment bolts and in particular to a license plate attachment means having a locking means for preventing removal of either the license plate or the renewal sticker which may be affixed to the license plate in either of two locations.

BACKGROUND OF THE INVENTION

A description of the related art is discussed in patent application Ser. No. 09/002062, filed Dec. 31, 1997, entitled "Theft Proof License Plate Apparatus, and this same description is applicable herein. Whereas the license plate locking device disclosed in said co-pending patent application functions very effectively for its intended purpose, the license plate locking device disclosed therein does have the following limitations:

a) the renewal sticker theft prevention window locking device is only applicable for license plates which display such renewal stickers in the upper right portion of the license plates;

b) the lock shackle is positioned such that it is readily attachable or exposed to cutting such as by a hacksaw or other cutting device; and c) the license plate locking device does not use the existing license plate screws/bolts for attachment.

Accordingly, it would be desirable if there were a license plate locking device that had a renewal sticker theft prevention window locking device that is applicable for license plates which display such renewal stickers in any corner of the license plates. It would further be desirable if there were a license plate locking device that had the lock shackle positioned such that it would not be readily attachable or exposed to cutting such as by a hacksaw or other cutting device-that is the lock shackle would be protected therefrom by enveloping the shackle in a protected enclosure. It would further be desirable if the license plate locking means if the license plate locking device/means does not use the existing license plate screws/bolts for attachment.

SUMMARY OF THE INVENTION

Briefly, the present invention is a locking device having a renewal sticker theft prevention window locking device that is applicable for license plates which display such renewal stickers in any corner of the license plates. The license plate locking means constructed according to the teachings of the invention has the lock shackle positioned such that it would not be readily attachable or exposed to cutting such as by a hacksaw or other cutting device-that is the lock shackle is protected therefrom by enveloping the shackle in a protected enclosure. The license plate locking means of the license plate locking device/means does use the existing license plate screws/bolts for attachment, but rather uses hollow license plate attachment screw cylinders that receive the existing license plate attachment screws and that cooperate with a locking device to prevent removal of the license plate attachment screws.

BRIEF DESCRIPTION OF THE DRAWINGS

The invention may be understood and further advantages and uses thereof more readily apparent, when considered in view of the following detailed description of the exemplary embodiments, taken with the accompanying drawings, in which.

DESCRIPTION OF THE PREFERRED EMBODIMENTS

Figure 1:
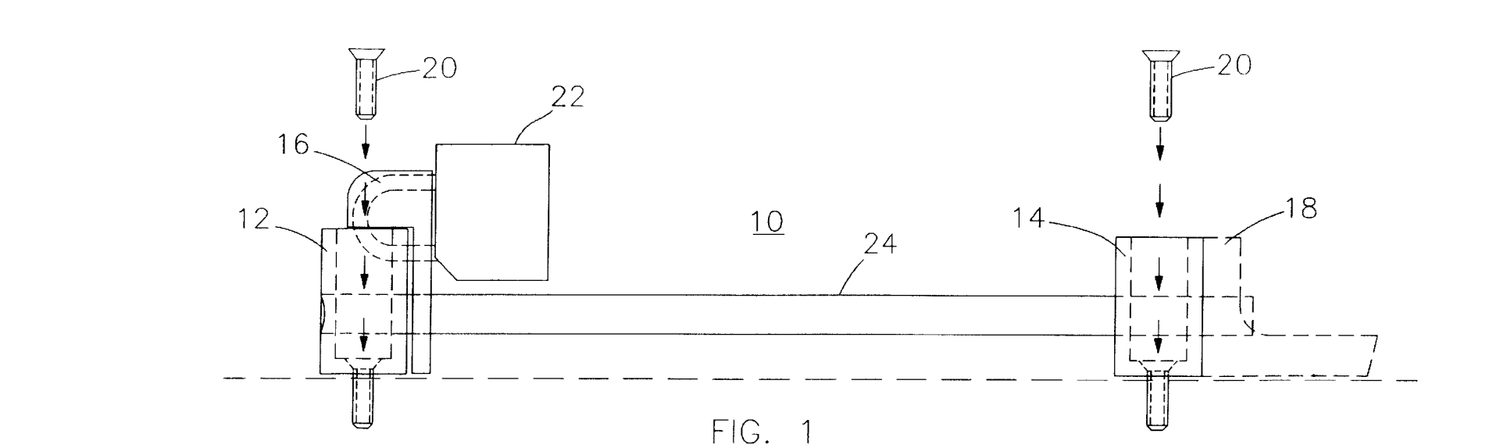
FIG. 1 is an elevational view of the license plate locking means constructed according to the teachings of the invention illustrating the hollow license plate attachment screw cylinders and the lock shackle protective stand fixture and the license plate renewal sticker theft prevention window, all mounted on a cylindrical rod.

Referring now to the drawings and to FIG. 1 in particular there is shown an elevational view of the license plate locking means 10 constructed according to the teachings of the invention illustrating the first and second hollow license plate attachment screw cylinders 12 and 14 respectively, and the lock shackle protective stand fixture 16 and the license plate renewal sticker theft prevention window 18, and the license plate attachment screws 20, and lock 22 all mounted on a cylindrical rod 24. Lock shackle protective stand fixture 16 is permanetly affixed to cylindrical rod 24 by locking pin 25. First and second hollow license plate attachment screw cylinders 12 and 14 respectively, although similar in that both are hollow cylinders for receiving license plate attachment screws or bolts 20, are constructed differently since first license plate attachment screw cylinder 12 must cooperate with the lock shackle protective stand fixture 16 and license plate attachment screw cylinder 14 must cooperate with the license plate renewal sticker theft prevention window 18, and of course both must cooperate so as to be mounted on cylindrical rod 24. The similarities and differences of license plate attachment screw cylinders 12 and 14 will be illustrated infra with respect to the drawings.

Figure 2:
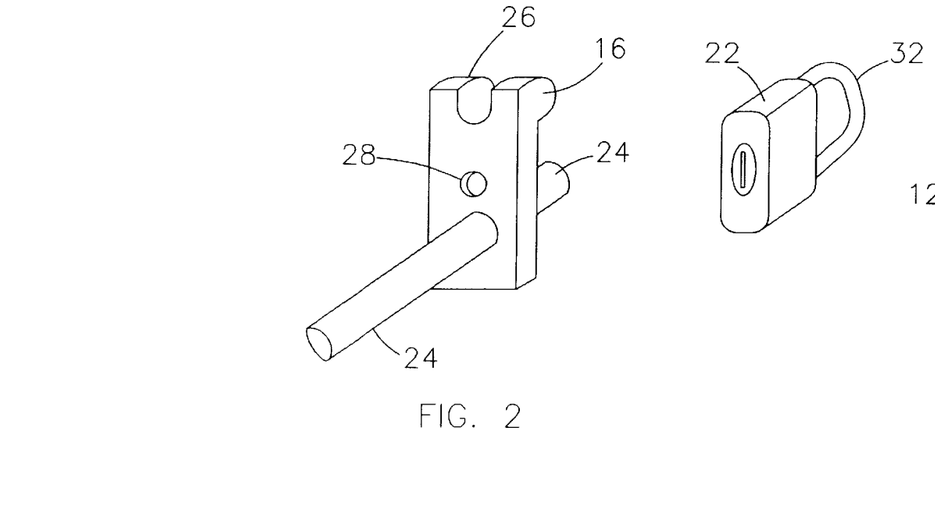
FIG. 2 is a detail elevational view of the lock shackle protective stand fixture, the lock prior to being locked in the lock shackle protective stand fixture and the mounting cylindrical rod, all constructed according to the teachings of the invention.
Figure 3:
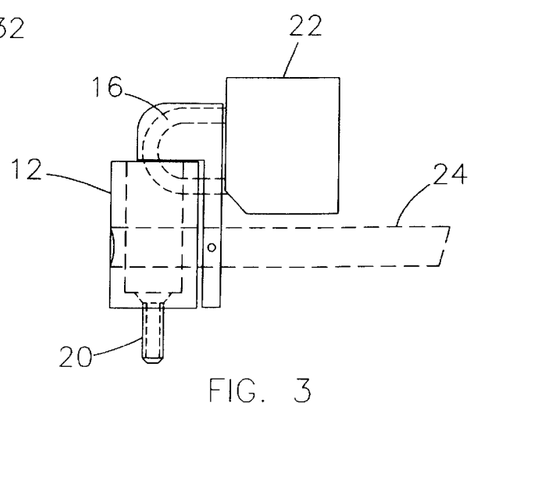
FIG. 3 is a detail elevational view of the lock shackle protective stand fixture, the locking means after being locked in the lock shackle protective stand fixture/hollow license plate attachment screw cylinder and the mounting cylindrical rod, all constructed according to the teachings of the invention.

Referring again now to the drawings and to FIG. 2 in particular there is shown a detail elevational view of the lock shackle protective stand fixture 16, and the lock 22 prior to being locked in the lock shackle protective stand fixture 16, and the mounting cylindrical rod 24, all constructed according to the teachings of the invention. Please note lock shackle groove 26 and hole 28 which cooperate to prevent access of lock 22's shackle 32. Referring now to FIG. 3 there is shown a detail elevational view of the lock shackle protective stand fixture 16, and the lock means 22 after being locked in both the lock shackle protective stand fixture 16 and first hollow license plate attachment screw cylinder 12 with both the lock shackle protective stand fixture 16 and first hollow license plate attachment screw cylinder 12 being mounted on cylindrical rod 24, all constructed according to the teachings of the invention and all cooperating to prevent access to both lock shackle 32 and license plate attachment screw 20.

Figure 4:
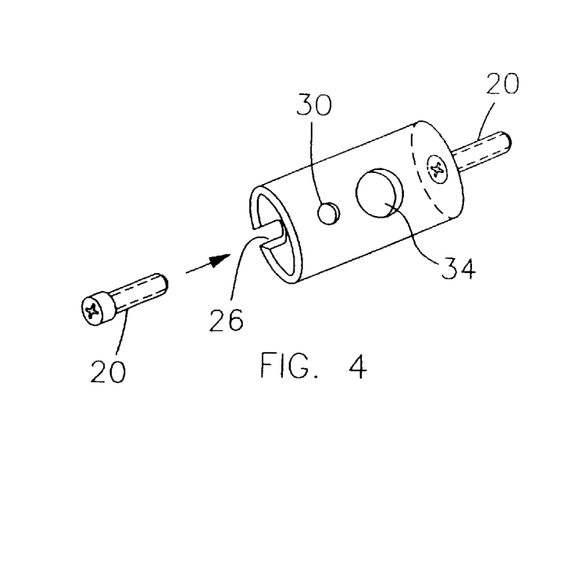
FIG. 4 is a detail elevational view of the hollow license plate attachment screw cylinder illustrating how it receives a license plate attachment screw.
Figure 5:
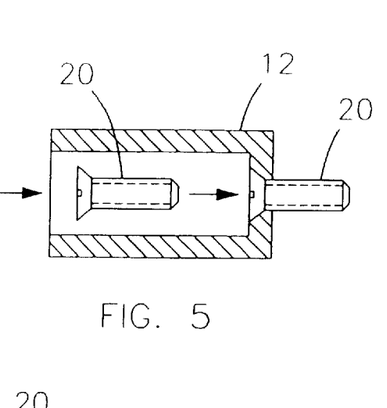
FIG. 5 is a detail cross-sectional view of the hollow license plate attachment screw cylinder illustrating how it receives a license plate attachment screw.
Figure 6:
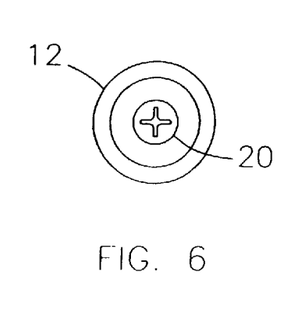
FIG. 6 is a detail plan view looking down on the attachment screw cylinder illustrating how it receives a license plate attachment screw.
Figure 7:
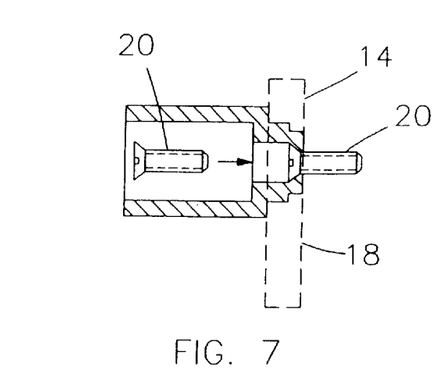
FIG. 7 is a cross-sectional view of another attachment screw cylinder illustrating how it receives a license plate attachment screw and in turn is then coupled with and fitted through the license plate renewal sticker theft prevention window.
Figure 8:
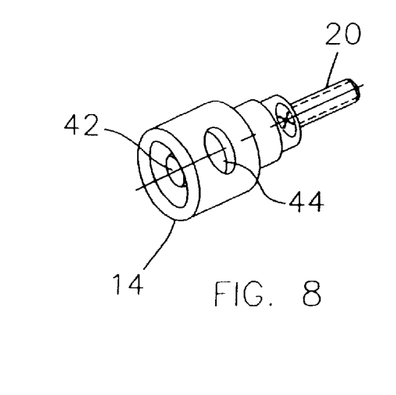
FIG. 8 is an elevational view of the attachment screw cylinder of FIG. 7 illustrating how it receives a license plate attachment screw just prior to being coupled with and fitted through the license plate renewal sticker theft prevention window.

Referring now to FIG. 4 there is shown a detail elevational view of the hollow license plate attachment screw cylinder 12 illustrating how it receives a license plate attachment screw 20. There is also illustrated in FIG. 4 the shackle receiving slot 26 and hole 30 as well as locking rod 24's receiving hole 34. Referring now to FIG. 5 there is shown a detail cross-sectional view of the hollow license plate attachment screw cylinder 12 illustrating how it receives a license plate attachment screw 20. Referring now to FIG. 6 there is shown a detail plan view looking down on the attachment screw cylinder 12 illustrating how it receives a license plate attachment screw 20. Referring now to FIG. 7 there is shown a cross-sectional view of another i.e. second attachment screw cylinder 14 illustrating how it receives a license plate attachment screw 20 and in turn is then coupled with and fitted through the license plate renewal sticker theft prevention window 18. Referring now to FIG. 8 there is shown an elevational view of the attachment screw cylinder 14 of FIG. 7 illustrating how it receives a license plate attachment screw 20 just prior to being coupled with and fitted through the license plate renewal sticker theft prevention window 18. Please note lock rod 24 receiving holes 42 and 44 for receiving lock rod 24.

Figure 9:
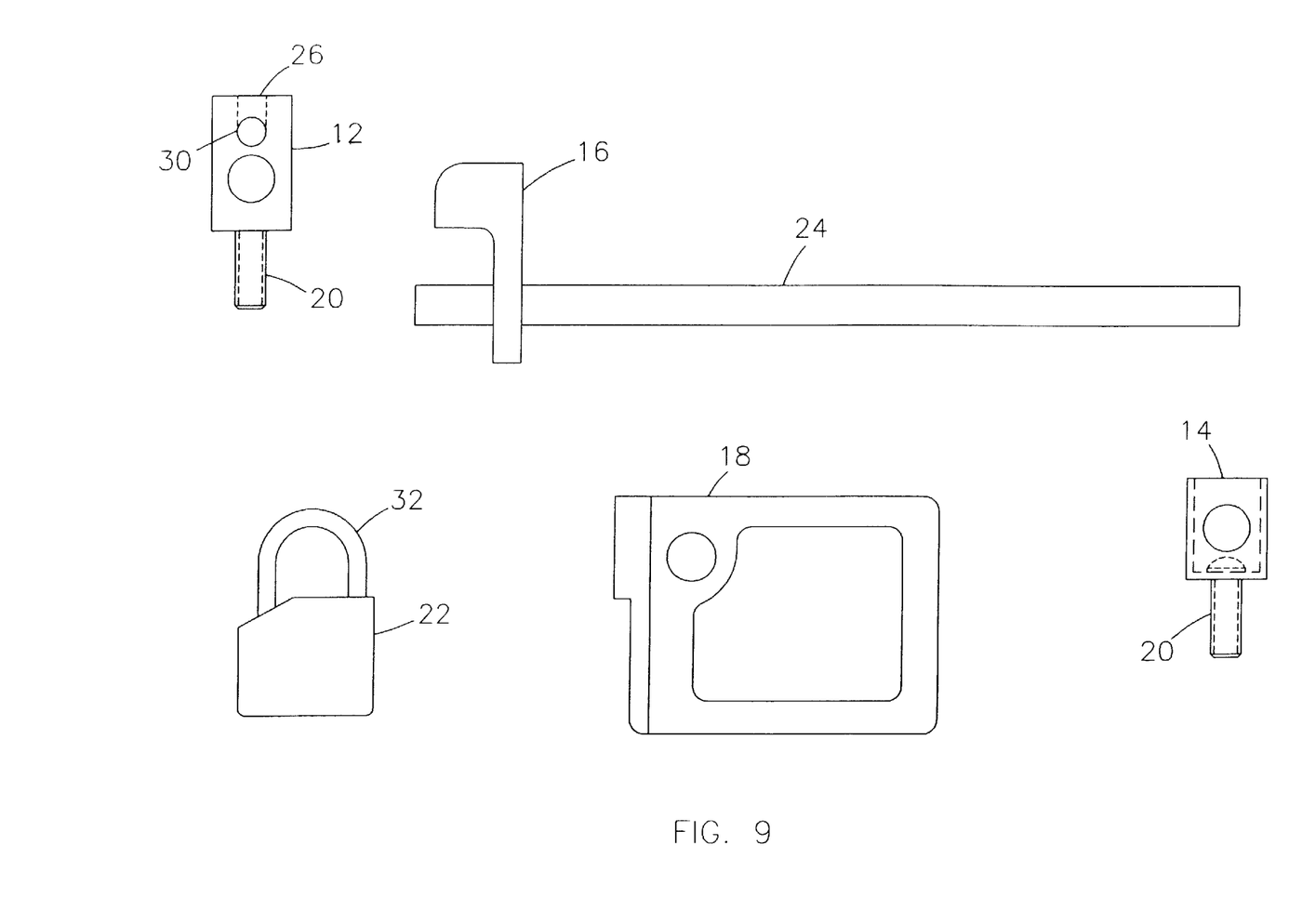
FIG. 9 is an elevational view of the individual components of the license plate locking device of the invention.
Figure 10:
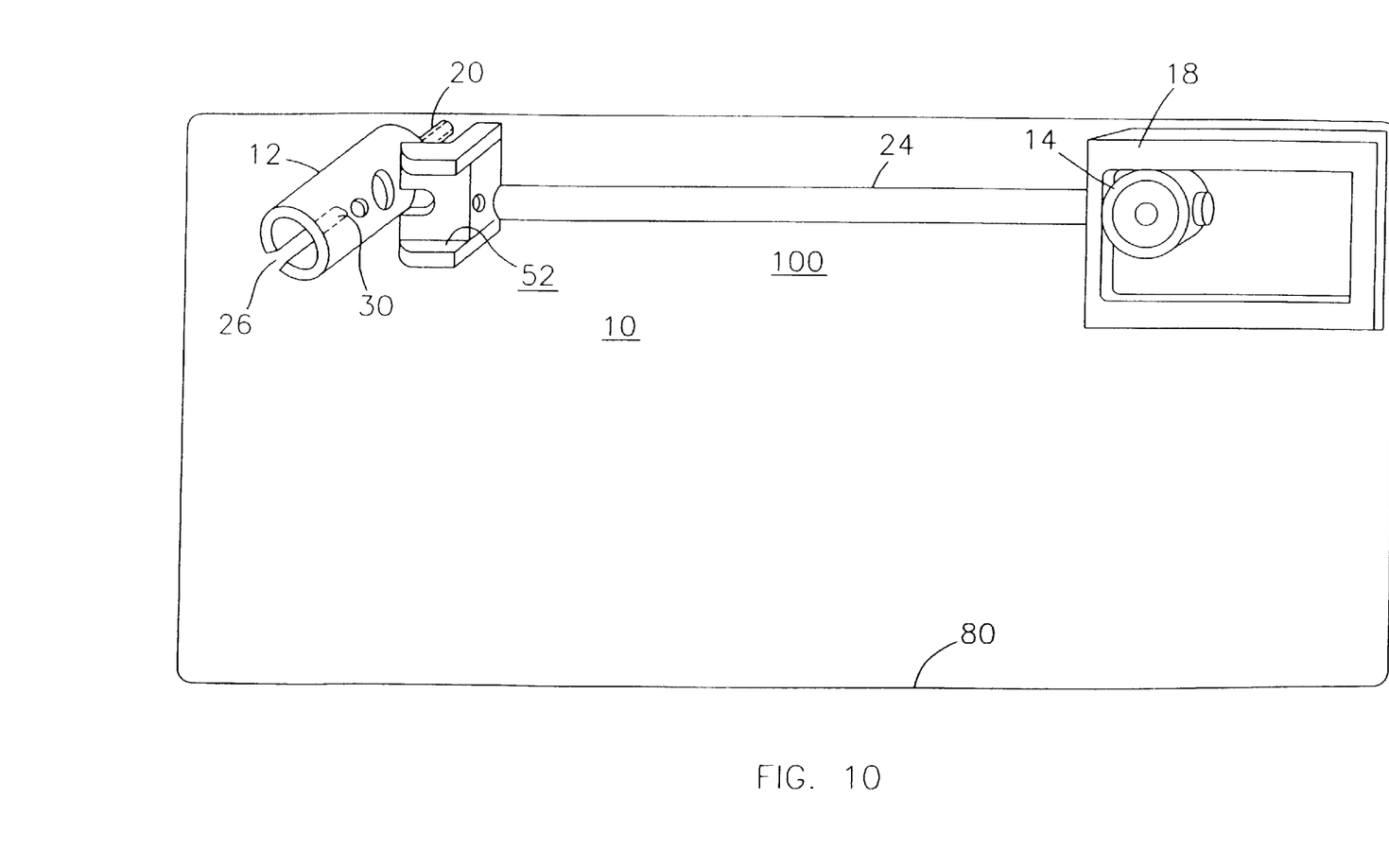
FIG. 10 is an elevational view of the partially assembled individual components of the license plate locking device of the invention mounted above a license plate.

Referring now to FIG. 9 there is shown an elevational view of the individual components of the license plate locking device of the invention. Referring now to FIG. 10 there is shown an elevational view of the partially assembled individual components 100 of the license plate locking device 10 of the invention mounted in front of a license plate 50. Please note the second attachment screw cylinder 14 illustrating how it receives a license plate attachment screw 20 and in turn is then coupled with and fitted through the license plate renewal sticker theft prevention window 18 while receiving lock bar 24 so as to prevent theft of either license plate 50 or any renewal sticker displayed behind license plate renewal sticker theft prevention window 18. Please also note that first attachment screw cylinder 12, especially slot 26 and hole 30 cooperate with channel 52 to receive and thereafter prevent access to the lock shackle of a loch means (not shown). attachment screw cylinder 12 illustrating how it receives a license plate attachment screw 20. Referring now to FIG. 7 there is shown a cross-sectional view of another i.e. second attachment screw cylinder 14 illustrating how it receives a license plate attachment screw 20 and in turn is then coupled with and fitted through the license plate renewal sticker theft prevention window 18. Referring now to FIG. 8 there is shown an elevational view of the attachment screw cylinder 14 of FIG. 7 illustrating how it receives a license plate attachment screw 20 just prior to being coupled with and fitted through the license plate renewal sticker theft prevention window 18. Please note lock rod 24 receiving holes 42 and 44 for receiving lock rod 24.

Referring now to FIG. 9 there is shown an elevational view of the individual components of the license plate locking device of the invention. Referring now to FIG. 10 there is shown an elevational view of the partially assembled individual components 100 of the license plate locking device 10 of the invention mounted in front of a license plate 50. Please note the second attachment screw cylinder 14 illustrating how it receives a license plate attachment screw 20 and in turn is then coupled with and fitted through the license plate renewal sticker theft prevention window 18 while receiving lock bar 24 so as to prevent theft of either license plate 50 or any renewal sticker displayed behind license plate renewal sticker theft prevention window 18. Please also note that first attachment screw cylinder 12, especially slot 26 and hole 30 cooperate with channel 52 to receive and thereafter prevent access to the lock shackle of a lock means (not shown).

Figure 11:
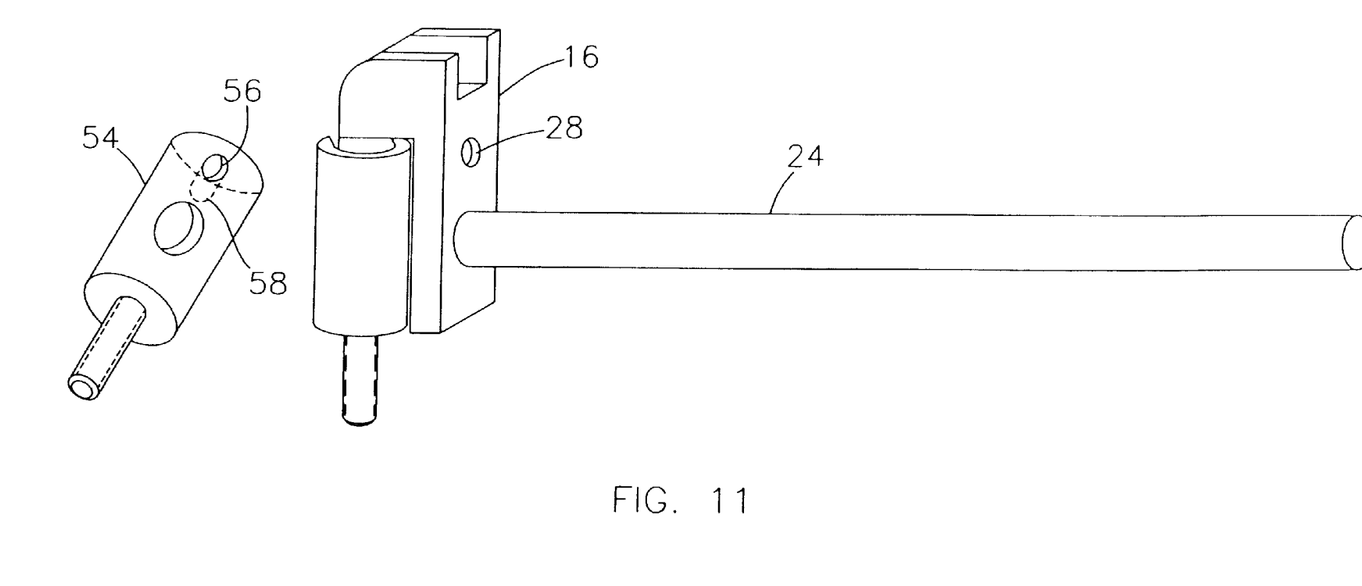
FIG. 11 is an elevational view of the partially assembled individual components of the license plate locking device of the invention this time with a license plate bolt having a lock shackle slot and hole disposed therein so as to cooperate with the lock shackle protective stand fixture of the invention to block access to the lock shackle.
Figure 12:
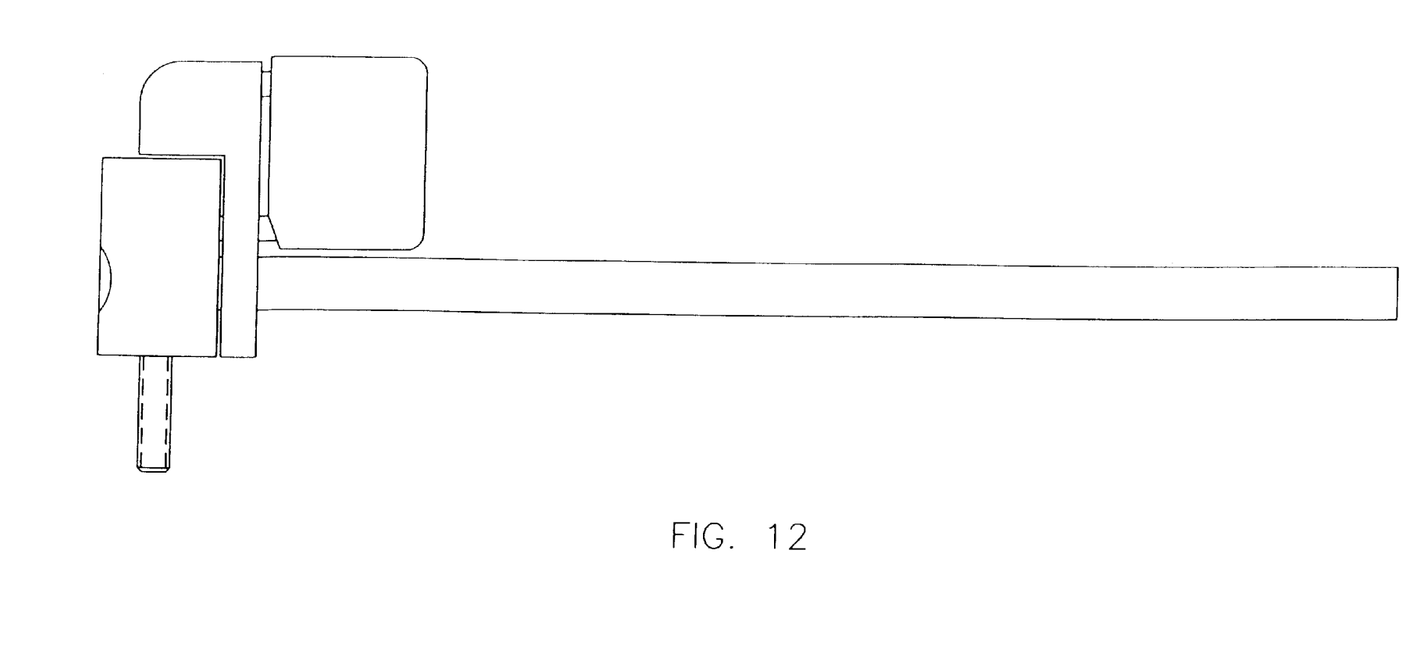
FIG. 12 is an elevational view of the fully assembled individual components of the license plate locking device of the invention this time with a license plate bolt having a lock shackle slot and hole disposed therein so as to cooperate with the lock shackle protective stand fixture of the invention to block access to the lock shackle.

Referring now to FIG. 11 there is shown an elevational view of the partially assembled individual components of the license plate locking device 10 of the invention this time with a license plate bolt 54 having a lock shackle slot 56 and hole 58 disposed therein so as to cooperate with the lock shackle protective stand fixture 16 of the invention to block access to the lock shackle (not shown). Referring now to FIG. 12 there is shown an elevational view of the fully assembled individual components of the license plate locking device 10 of the invention this time with a license plate bolt having a lock shackle slot and hole disposed therein so as to cooperate with the lock shackle protective stand fixture of the invention to block access to the lock shackle.

Figure 13:
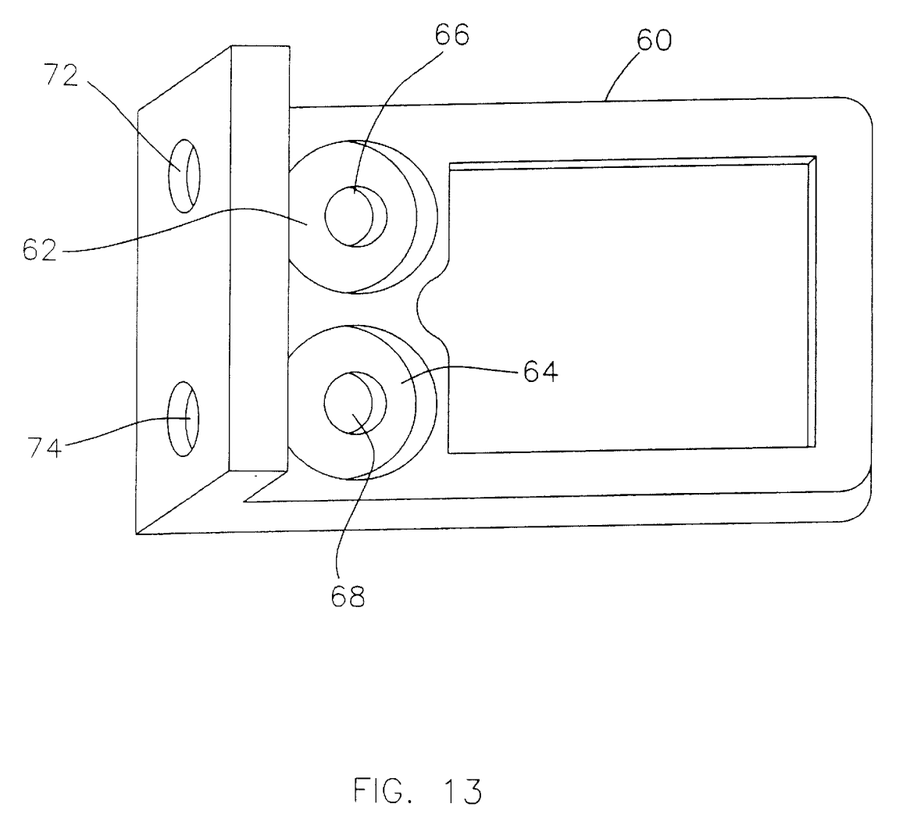
FIG. 13 is an elevational view of the reversible license plate renewal sticker theft prevention window of the invention.

Referring now to FIG. 13 there is shown an elevational view of the reversible license plate renewal sticker theft prevention window 60 of the invention. Reversible license plate renewal sticker theft prevention window 60 of the invention now has two second attachment screw cylinder 14 receiving collars 62 and 64 having holes 66 and 68 respectively disposed therein so as to receive second attachment screw cylinder 14 in either location of any corner of license plate 50. Lock rod receiving holes must also be dual holes and are shown at 72 and 74 respectfully. In this manner reversible license plate renewal sticker theft prevention window 60 of the invention now has two reciprocal mounting positions to be capable of mounting on lock rod 24 in either position and block access to a renewal sticker in any of four positions.

Figure 14:
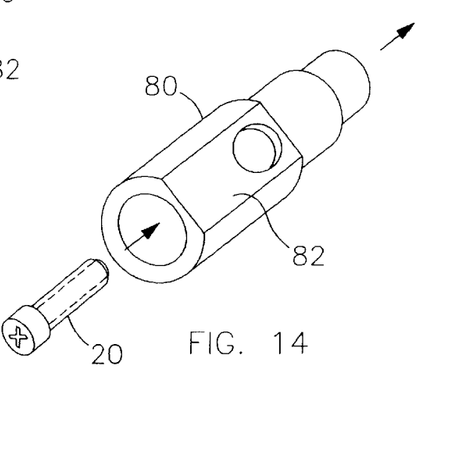
FIG. 14 is an elevational view of another second hollow license plate attachment screw cylinder illustrating the flat side for cooperating with the license plate renewal sticker theft prevention window.
Figure 15:
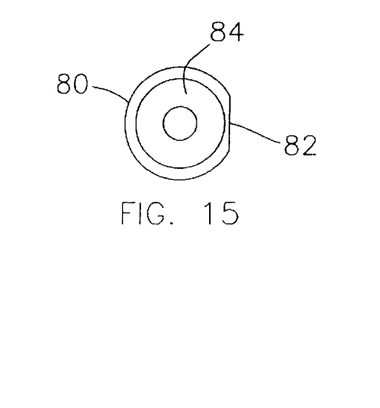
FIG. 15 is a plan view looking in the barrel of a second hollow license plate attachment screw cylinder illustrating another view of the flat side for cooperating with the license plate renewal sticker theft prevention window.
Figure 16:
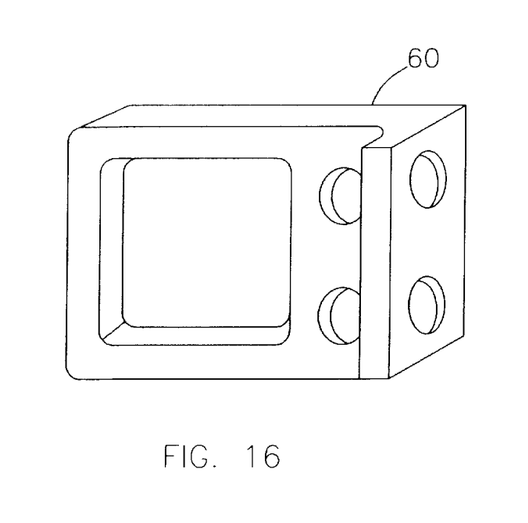
FIG. 16 is an elevational view of the reversible license plate renewal sticker theft prevention window of the invention.
Figure 17:
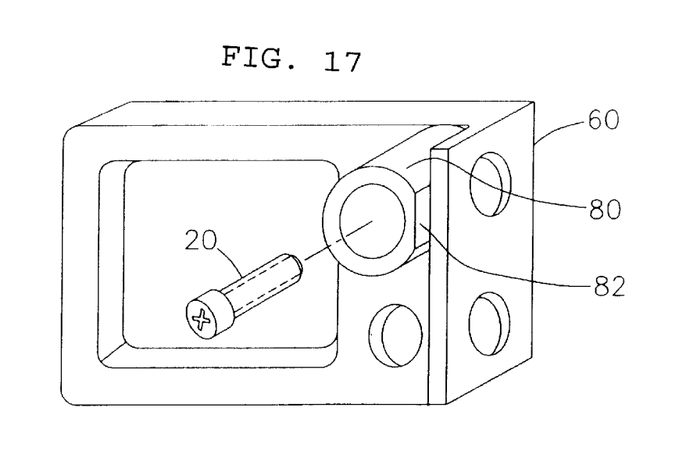
FIG. 17 is an elevational view of the reversible license plate renewal sticker theft prevention window of FIG. 16 illustrating how it cooperates with the second hollow license plate attachment screw cylinder.
Figure 18:
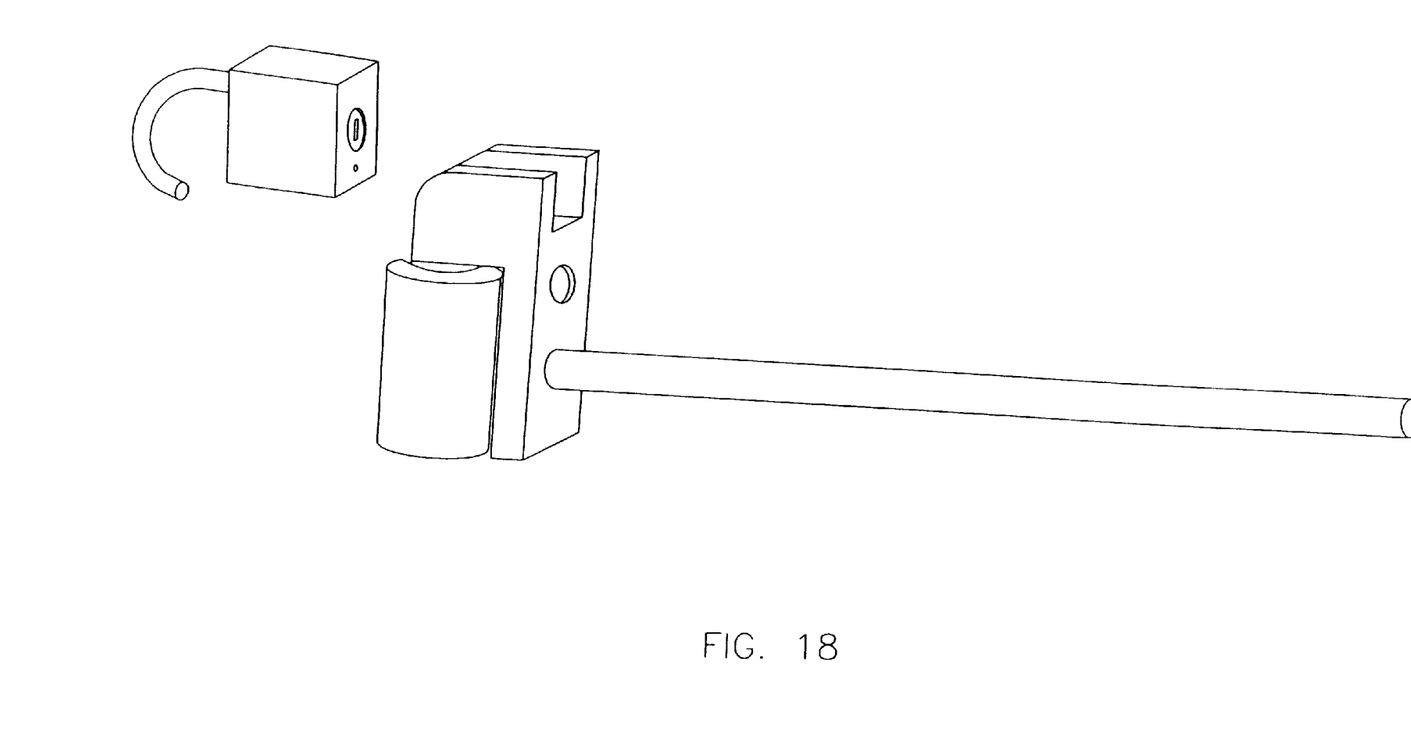
FIG. 18 is an elevational view illustrating how the lock body passes through the fixed plate.

Referring now to FIG. 14 there is shown an elevational view of another second hollow license plate attachment screw cylinder 80 illustrating the flat side 82 for cooperating with the license plate renewal sticker theft prevention window 60. Referring now to FIG. 15 there is shown a plan view looking in the barrel 84 of second hollow license plate attachment screw cylinder 80 illustrating another view of the flat side 82 for cooperating with the license plate renewal sticker theft prevention window. Referring now to FIG. 16 there is shown an elevational view of the reversible license plate renewal sticker theft prevention window 60 of the invention. Referring now to FIG. 17 there is shown an elevational view of the reversible license plate renewal sticker theft prevention window 60 of FIG. 16 illustrating how it cooperates with the flat side 82 of second hollow license plate attachment screw cylinder 80 to provide for locking into and along the side of reversible license plate renewal sticker theft prevention window 60 of FIG. 16.

I claim:

1. A locking device having a renewal sticker theft prevention window locking device that is applicable for license plates which display such renewal stickers in any corner of the license plate comprising:

a lock rod having a fixed plate thereon, said fixed plate having a lock shackle protective enclosure for at first allowing a lock shackle therethrough in an exposed position and then receiving said shackle an a locked, non-exposed, protected position, said fixed plate also including a channel for allowing a lock body to pass therethrough and then reside behind said fixed plate;

a first hollow license plate attachment cylinder for receiving the existing license plate screws and for cooperating with said lock shackle protective enclosure; and a flat plate having a face with an opening for viewing a renewal sticker and at least one hole disposed therein on one side of said opening for receiving a second license plate attachment cylinder;

wherein said lock rod cooperates with said first and second license plate attachment cylinders to prevent removal of said screws.

2. The locking device of claim 1 wherein each hollow license plate attachment cylinder includes a hollow tube including a tube wall, an open end and a closed end, said closed end having an aperture disposed therein, said aperture having a predetermined size for allowing passage of the license plate screw shaft therethrough, but preventing passage of said license plate attachment screw head such that the screw head captures the closed end of the tube and attaches and retains the tube to a car frame, said hollow tube having at least one opening disposed in said tube wall for allowing said lock rod to pass therethrough and thereby prevent access to said screw head.

3. The locking device of claim 2 wherein the hollow tube further includes a second opening disposed in said tube wall to allow passage of said lock rod through both sides of said tube wall.

4. The locking device of claim 3 wherein the hollow tube includes a third opening disposed in said tube wall to allow passage of the lock shackle therethrough.

* * * * *